(12) United States Patent
Mronga et al.

(10) Patent No.: US 7,837,781 B2
(45) Date of Patent: Nov. 23, 2010

(54) COLORANTS COMPRISING TIN AND RARE EARTH ELEMENTS

(75) Inventors: Norbert Mronga, Dossenheim (DE); Kirill Bramnik, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/522,925

(22) PCT Filed: Dec. 17, 2007

(86) PCT No.: PCT/EP2007/064049

§ 371 (c)(1), (2), (4) Date: Jul. 13, 2009

(87) PCT Pub. No.: WO2008/083897

PCT Pub. Date: Jul. 17, 2008

(65) Prior Publication Data

US 2010/0050903 A1   Mar. 4, 2010

(30) Foreign Application Priority Data

Jan. 12, 2007 (EP) .................................. 07100489

(51) Int. Cl.
| | |
|---|---|
| *C09C 1/36* | (2006.01) |
| *C09C 1/00* | (2006.01) |
| *C09C 1/02* | (2006.01) |
| *C09C 1/04* | (2006.01) |
| *C01G 23/00* | (2006.01) |

(52) U.S. Cl. .................... 106/428; 106/426; 423/593.1; 423/594.9; 423/598

(58) Field of Classification Search ................. 106/426, 106/428; 423/593.1, 594.9, 598
See application file for complete search history.

(56) References Cited

U.S. PATENT DOCUMENTS 4,448,608 A   5/1984   Jenkins et al.

FOREIGN PATENT DOCUMENTS

| EP | 0 113 229 | 7/1984 |
|---|---|---|
| EP | 1 690 523 | 8/2006 |

*Primary Examiner*—Anthony J Green
(74) *Attorney, Agent, or Firm*—Oblon, Spivak, McClelland, Maier & Neustadt, L.L.P.

(57) ABSTRACT

A pigment of empirical composition $$(TiO_2)_a(ZnO)_b(SnO)_c(SnO_2)_d(RE_xO_y)_e(AEO)_f(M_uO_v)_g$$

wherein
RE is a metal from transition group 3 or a rare earth metal,
AE is an alkaline earth metal, and
M is any other metal, where
a=0.8-3; b=0.5-1.3; c=0.5-1.3; d=0-0.5; e=0-0.3; f=0-0.3; and g=0-0.1,
and e+f≧0.01.

Preferably RE is selected from the elements Y, La, Ce, and Pr.

The pigments are used as colorants for coloring paints, inks, plastics, and rubber.

17 Claims, No Drawings

COLORANTS COMPRISING TIN AND RARE EARTH ELEMENTS

CROSS REFERENCE TO RELATED APPLICATION

This application is a 371 of PCT/EP07/064049, filed on Dec. 17, 2007, and claims priority to European Patent Application No. 07100489.9, filed on Jan. 12, 2007.

The invention relates to pigments based on titanium oxide, zinc oxide and tin oxides comprising rare earth metal oxides and/or alkaline earth metal oxides.

Colorants with the composition $(TiO_2)_a(ZnO)_b(SnO)_c(SnO_2)_d$ are described in U.S. Pat. No. 4,448,608. The crystal structure of the pigments is unknown. In the X-ray powder diffractogram (CuKα radiation) the colorants have five main peaks at 2Θ (relative intensity)=20.69° (10), 31.24° (100), 36.22° (20), 52.14° (22), and 62.03° (20). Depending on the molar proportions of a, b, c, and d in the metal oxides, pigments of different colors are obtained. As well as yellow and orange hues, green, brown, and gray hues are also possible. Preferred hues are orange and yellow. Critical for the color is the fraction of Sn(II) (as SnO) in the crystal. Preferred compositions for orange pigments feature compositions where a=1 to 3, b=1, c=1, and d=0. As the amount of $SnO_2$ increases (d>0), the hue is shifted toward yellow. If the fraction of SnO is reduced, the pigments become increasingly lighter and weaker in color until ultimately a white or pale gray pigment results.

For use as chromatic pigments, the desire is generally for colorants which possess high color brilliance (chroma) and high lightness. The compositions looked for are therefore those which produce pigments of maximum coloristic cleanness and lightness. Additionally a high color strength is desired. Pigments possessing a high color strength are more productive, since less pigment is needed in order to bring about a given depth of color in a varnish or plastic.

U.S. Pat. No. 4,448,608 specifies two different production methods for the pigments. One production method involves dissolving salts of the elements titanium, zinc and tin in water with addition of acid. Then, in a nonoxidizing, inert atmosphere (e.g., nitrogen atmosphere), aqueous alkali metal hydroxide solution is added to precipitate the hydroxides or oxide hydrates of the metals, which are filtered, washed free of alkali, dried, and calcined at temperatures between 800 and 1000° C. under nitrogen. All of these operating steps must be carried out in an inert gas atmosphere, in order to prevent oxidation of Sn(II) to Sn(IV). Calcining is followed by a grinding operation for size reduction of agglomerates formed.

An alternative production method comprises the dry mixing of the raw materials $TiO_2$, ZnO and SnO (and $SnO_2$ if appropriate), calcining of the mixture at temperatures between 800 and 1000° C. in an inert gas atmosphere, and grinding of the resulting furnace clinker.

Key to the coloristic cleanness and color strength is an extremely homogeneous commixing of the individual components prior to calcining. Preference is therefore given to the production method which ensures optimum commixing by precipitating the elements in the form of the hydroxides and/or oxide hydrates. The method, though, is hampered by the drawback that all of its steps have to be carried out with complete exclusion of oxygen.

It is an object of the present invention to provide further light, clean-colored and strongly colored pigments. A particular object is to improve the prior-art pigments based on titanium oxide, zinc oxide and tin oxides in respect of lightness, cleanness of color, and color strength.

This object is achieved by means of pigments of empirical composition

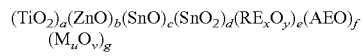
$(TiO_2)_a(ZnO)_b(SnO)_c(SnO_2)_d(RE_xO_y)_e(AEO)_f(M_uO_v)_g$ wherein
RE is a metal from transition group 3 or a rare earth metal,
AE is an alkaline earth metal, and
M is any other metal, where
a=0.8-3; b=0.5-1.3; c=0.5-1.3; d=0-0.5; e=0-0.3; f=0-0.3; and g=0-0.1,
and e+f≧0.01.

Surprisingly it has been found that light, clean-colored and strongly colored pigments are obtained if the known components $TiO_2$, ZnO and SnO, and also $SnO_2$ as well if appropriate, are supplemented by rare earth metal oxides and/or alkaline earth metal oxides.

RE is a metal from transition group 3 or a rare earth metal. The elements concerned are, specifically, Sc, Y, La, Ce, Pr, Nd, Sm, Eu, Gd, Tb, Dy, Ho, Er, Tm, Yb and Lu. Within the pigments of the invention, these elements may occur as purely divalent oxides REO, purely trivalent oxides $RE_2O_3$ or purely tetravalent oxides $REO_2$ and also as oxides with mixed oxidation states, which as well as the divalent metal RE(II) also comprise the trivalent metal RE(III), or as well as the trivalent metal RE(III) also comprise the tetravalent metal RE(IV). Consequently the stoichiometric composition can vary between REO and $RE_2O_3$ and/or between $RE_2O_3$ and $REO_2$; in other words, for x=1, y varies from 1 to 2 in $RE_xO_y$. Hence the elements yttrium and lanthanum are generally present in the pigments of the invention as $Y_2O_3$ and $La_2O_3$, respectively. The element cerium is generally present as $CeO_2$. The element praseodymium may be present both as $Pr_2O_3$ and as $PrO_2$ and also in the form of Pr(III)/Pr(IV) mixed oxides, and may for example have the stoichiometric composition $Pr_6O_{11}$. Further mixed oxides of praseodymium are $Pr_{12}O_{22}$, $Pr_{11}O_{20}$, $Pr_{10}O_{18}$, $Pr_9O_{16}$, $Pr_8O_{14}$, $Pr_7O_{12}$ and $Pr_6O_{10}$. The elements Eu and Yb may also be present as stable divalent oxides EuO and YbO, respectively.

Preferred pigments of the invention comprise at least one of the elements yttrium, lanthanum, cerium and praseodymium, or two or more of these elements.

The pigments of the invention may further comprise an alkaline earth metal AE. Preferred alkaline earth metals are Ca, Sr and Ba; Mg is less preferable.

In one embodiment of the invention e is =0.01-0.3 and f is =0.01-0.3; in other words, the pigment comprises AE as well as RE. AE is preferably selected from Ca, Sr and Ba. In a further embodiment e is =0.01-0.3 and f is =0; in other words, the pigment does not comprise AE. In both cases RE is preferably selected from Y, La, Ce and Pr. In another embodiment e is =0 and f is =0.01-0.3; in other words, the pigment comprises no RE.

Preferably a is =1.0-3, b is =0.7-1.3, and c is =0.7-1.3. With preference e and f are each in the range of 0.02-0.15, more preferably of 0.02-0.125.

The pigments of the invention may comprise further metals M. Preferred further metals M are selected from Zr, Al and Si, which may generally be present as $ZrO_2$, $Al_2O_3$ or $SiO_2$ or as mixed oxides of two of more of the stated metals. Less preferred metals M are V, Nb, Mo, W, Sb, Bi and Pb.

The invention also provides methods of producing the pigments of the invention.

In one method the oxidic raw materials, $TiO_2$, ZnO, SnO, if appropriate $SnO_2$, $RE_xO_y$ and/or AEO and, if appropriate, $M_uO_v$, or precursors of these oxides, are mixed in the form of dry powders, the mixture is calcined at temperatures between 800 and 1100° C. in an inert gas atmosphere, and the resulting furnace clinker is ground.

As a result of the dry synthesis, composed of the individual steps of mixing all of the raw materials, calcining the raw mixture, and subsequent conventional grinding (wet grinding or dry grinding) it is possible to produce the pigments of the invention even on the industrial scale without abnormal cost or inconvenience.

In lieu of the oxides of the stated elements it is also possible to employ oxide precursors which on heating are transformed into oxides, such as, for example, the hydroxides, carbonates, oxide hydrates, and basic carbonates of the stated elements.

Generally speaking, Y is added as $Y_2O_3$, La as $La_2O_3$, Ce as $CeO_2$, and Pr as $Pr_6O_{11}$.

An alternative possibility is to produce the pigments of the invention by dissolving the salts of the elements titanium, zinc, tin, RE and if appropriate AE in water with addition of acid in a nonoxidizing, inert atmosphere (e.g., nitrogen atmosphere), precipitating the hydroxides or oxide hydrates of titanium, zinc, tin, RE and/or AE by addition of aqueous alkali metal hydroxide solution, filtering, washing, drying, and calcining at temperatures between 800 and 1100° C. in an inert gas atmosphere. The stated elements are preferably dissolved in the form of their chlorides or nitrates.

The presence of the adjuvant elements RE and/or AE leads to a significant increase in the coloristic cleanness (chroma) to a considerable rise in the color strength and to a considerable heightening of the lightness of the pigments in tandem with a slight color shift toward yellow, as compared with pigments of the formula $(TiO_2)_a(ZnO)_b(SnO)_c(SnO_2)_d$ from which these adjuvant elements are absent. The inventive fraction of adjuvant elements RE and/or AE in the pigments yields light and strongly colored pigments of high brilliance.

The pigments of the invention can be employed diversely as colorants. Preferred fields of use of the pigments are as colorants for coloring paints, printing inks, liquid inks, plastics and rubber. Paints are aqueous or solvent-borne coating materials and also powder coating materials, in which the pigments of the invention may be employed alone or in combination with extenders, white pigments, chromatic pigments or black pigments. Binders that can be used include all of the binders that are usual in the coatings sector. Coating materials which can be colored with the pigments of the invention include more particularly:

oil-based coating materials (based on linseed oil or polyurethane oils),
cellulose-based coating materials (NC, CAB, CAP),
coating materials based on chlorinated rubber,
vinyl coating materials (based on PVC, PVDF, VC copolymer, polyvinyl acetate, polyvinyl ester dispersion, polyvinyl alcohol, polyvinylacetal, polyvinyl ether, polystyrene, styrene copolymers),
acrylate coating materials,
alkyd coating materials,
saturated polyester coating materials,
unsaturated polyester coating materials,
polyurethane coating materials (one pack, two pack),
epoxy coating materials,
silicone coating materials,
silicate coating materials (based on waterglass, alkyl silicates).

These coating systems are described in detail in D. Stoye, W. Freitag, Paints, Coatings and Solvents, Second Edition, 1998, Wiley-VCH.

Combinations with platelet-shaped metallic and/or oxidic effect pigments are also possible and lead to interesting goniochromatic effects. The pigments of the invention can also be used with advantage to color customary plastics and blends of plastics, either as pigments alone or in combination with white, chromatic, and black pigments, and in combination with all typical additives and stabilizers. Suitable plastics include unplasticized and plasticized PVC, polyolefins, and also all engineering plastics such as ABS, polystyrene, polyamide, polyester, polycarbonate, polyetherketone, and also polyurethanes and rubber systems. The pigments can be incorporated by means of typical mixing, blending, kneading and extrusion techniques. The pigments are chemically inert and highly weather- and temperature-resistant, so making them equally suitable for interior and exterior applications. In white reductions, the pigments display a substantially higher color strength than the pigments described in U.S. Pat. No. 4,448,608, and are therefore much more productive.

The pigments exhibit high reflectivity in the near infrared region and hence can be used with advantage, alone or in a mixture with further suitable pigments and extenders, in those paint materials or plastics particles which under insulation are intended to limit the heating-up of interior spaces (e.g., of buildings and vehicles).

For mixtures with white pigments the following are suitable:
C.I. Pigment White 4, 5, 6 and 7.
For mixtures of black pigments the following are suitable:
C.I. Pigment Black 6, 7,11, 26, 27, 28, 29, 30 and 32,
C.I. Pigment Brown 29 and 35.
For mixtures with inorganic chromatic pigments the following are suitable:
C.I. Pigment Yellow 42, 34, 53, 161, 162, 163, 164, 184 and 189,
C.I. Pigment Brown 24 and 37,
C.I. Pigment Red 101 and 104,
C.I. Pigment Blue 28 and 36,
C.I. Pigment Green 17 and 50.

Organic chromatic pigments that are suitable for mixtures originate for example from the group of phthalocyanine pigments, indanthrone pigments, anthrapyrimidine pigments, dioxazine pigments, quinacridone pigments, perylene pigments, pyrazoloquinazolone pigments, isoindoline pigments, isoindolinone pigments, azo pigments, diketopyrrolopyrrole pigments, quinophthalone pigments and anthraquinone pigments. Suitable examples of the individual classes of organic pigments include the following:
phthalocyanine pigments:
C.I. Pigment Blue 15, 15:1, 15:2, 15:3, 15:4, 15:6, 16,
C.I. Pigment Green 7, 36;
indanthrone pigments:
C.I. Pigment 60;
anthrapyrimidine pigments:
C.I. Pigment Yellow 108;
dioxazine pigments:
C.I. Pigment Violet 23;
quinacridone pigments:
C.I. Pigment Red 122 and 202,
C.I. Pigment Violet 19;
perylene pigments:
C.I. Pigment Red 123, 178, 179 and 224;
pyrazoloquinazolone pigments:
C.I. Pigment Orange 67 and C.I. Pigment Red 216;

isoindoline pigments:
- C.I. Pigment Yellow 139 and 185,
- C.I. Pigment Orange 61 and 69,
- C.I. Pigment Red 257 and 260;

isoindolinone pigments:
- C.I. Pigment Yellow 109, 110 and 173;

azo pigments:
- C.I. Pigment Yellow 2, 13, 62, 74, 83, 151, 154, 168 and 191,
- C.I. Pigment Orange 5, 13, 34, 36, 64 and 67,
- C.I. Pigment Red 1, 2, 3, 4, 5, 23, 48:1, 48:2, 48:3, 48:4, 49, 49:1, 51, 51:1, 53, 53:1, 57:1, 58:2, 58:4, 112, 144, 146, 148, 166, 170, 184, 214, 220, 221 and 251;

diketopyrrolopyrrole pigments:
- C.I. Pigment Orange 71 and 73,
- C.I. Pigment Red 254, 255, 264 and 272;

quinophthalone pigments:
- C.I. Pigment Yellow 138 and 108;

anthraquinone pigments:
- C.I. Pigment Red 177.

The pigment mixtures comprise 10% to 99% by weight of the further organic and/or inorganic pigments and 1% to 90% by weight of the pigments of the invention.

Examples of suitable platelet-shaped pigments include the following:

metal pigments:
- aluminum pigments, steel pigments, zinc pigments;

coated metal pigments:
- iron oxide-coated aluminum pigments, titanium dioxide-coated aluminum pigments, iron oxide/titanium oxide-coated aluminum pigments, aluminum oxide-coated aluminum pigments, aluminum oxide/iron oxide-coated aluminum pigments, silicon oxide-coated aluminum pigments, silicon suboxide-coated aluminum pigments, silicon oxide/iron oxide-coated aluminum pigments, magnesium fluoride/chromium-coated aluminum pigments;

coated oxidic pigments:
- titanium oxide-coated mica pigments, iron oxide-coated mica pigments, titanium oxide/iron oxide-coated mica pigments, titanium oxide-coated aluminum oxide pigments, iron oxide-coated aluminum oxide pigments, titanium oxide/iron oxide-coated aluminum oxide pigments, titanium oxide-coated glass pigments, iron oxide-coated glass pigments, titanium oxide/iron oxide-coated glass pigments, titanium oxide-coated $SiO_2$ pigments, iron oxide-coated $SiO_2$ pigments, titanium oxide/iron oxide-coated $SiO_2$ pigments, iron oxide/silicon oxide-coated mica pigments, titanium oxide/silicon oxide-coated mica pigments,
- iron oxide/silicon oxide-coated glass pigments, titanium oxide/silicon oxide-coated glass pigments, iron oxide/silicon oxide-coated aluminum oxide pigments, titanium oxide/silicon oxide-coated aluminum oxide pigments, titanium oxide-coated mica pigments further coated with organic dyes and/or organic pigments, and iron oxide-coated mica pigments further coated with organic dyes and/or organic pigments;

bismuth oxychloride pigments;

platelet-shaped iron oxide pigments.

The pigment mixtures comprise 10% to 99% by weight of the platelet-shaped pigments and 1% to 90% by weight of the pigments of the invention.

The invention is illustrated by the examples below.

EXAMPLES

The pigments are produced using the metal oxides listed below:

$TiO_2$: Anatase Kronos 1001
ZnO: from Riedel-de Haën
SnO: 99% purity, ABCR GmbH & Co. KG
$SnO_2$: Tego RL from Elektro Thermit GmbH
$La_2O_3$: 99.98% from Fluka
$CeO_2$: >99% purity from Fluka
$Y_2O_3$: from ABCR GmbH & Co. KG The pigments are synthesized in a rotating quartz flask with a capacity of 500 ml, located within an electrically heated clamshell furnace. After the crude pigment mixture has been introduced, the flask is sealed with a stopper which has openings for a gas supply tube and a gas removal tube and also for a thermocouple. The thermocouple regulates the temperature of the clamshell furnace. Through the gas introduction tube a stream of nitrogen is passed through the flask at a constant metering rate of 10-15 l/h (stp). The contents of the quartz flask are rendered inert with nitrogen for half an hour, during which the flask is rotated, and then heating takes place to 900° C. over the course of 1 h and this temperature is maintained for 1 h. Subsequently, under nitrogen, the flask is cooled to room temperature. The calcined pigment (furnace clinker) is subsequently ground.

For grinding, a porcelain mortar with a capacity of 500 ml is charged with 30 g of furnace clinker together with 60 g of drinking water and 250 g of glass grinding beads (2 mm in diameter) and grinding is carried out for 10 minutes in a vibratory mill (from Retsch). The grinding beads are separated from the pigment suspension via a sieve, the suspension is filtered, and the pigment is dried at 160° C. in a forced-air drying oven for 1 h and then subjected to deagglomeration for 15 s in a Braun mixer.

For assessment of the coloristic properties of the pigments, pigment dispersions in PVC plastisol paste are prepared which are cured by 15-minute heating at 160° C. in a forced-air drying oven. After the curing procedure, the pigmented plastisol is subjected to colorimetry using an Optronic Multiflash spectrophotometer. The pigments are measured in masstone (chromatic pigment only) for hue HGD, chroma $C^*$ and lightness $L^*$, and in white reduction, consisting of 1 part of chromatic pigment+3 parts of rutile Kronos 2056,=>corresponding to a reduction of 1:4, for color equivalents (CE). In this context, comparative example 1 has the arbitrarily awarded CE value of 160. For a different pigment, then, a CE value of 80 denotes twice the color strength, a CE value of 320 half the color strength. The comparison pigment used is a product having the composition $(TiO_2)_{1.6}(ZnO)_1(SnO)_1$.

Composition of the plastisol: 40 parts by weight dinonyl phthalate (Palatinol® N) and 60 parts by weight PVC (Vestolit® 7012).

Preparation of a Mass Tone Paste:

0.6 g of chromatic pigment are dispersed with 6 g of plastisol on a JEL 25.86 plate-type muller (from Engelsmann) with 100 revolutions under a weight of 50 kg. The chromatic pigment paste that results is applied in a film thickness of 800 μm to a glass plate by means of a flat coating bar in a film coating apparatus (from Erichsen) and after a short flash-off time is cured in a forced-air drying oven at 160° C. for 15 minutes.

Preparation of a White Reduction Paste:

0.15 g of chromatic pigment and 0.45 g of rutile pigment are dispersed with 6 g of plastisol on an Engelsmann JEL 25.86 plate-type muller with 150 revolutions under a weight of 75 kg. The chromatic pigment/white paste that results is applied in a film thickness of 800 μm to a glass plate by means of a flat coating bar in a film coating apparatus (from Erichsen) and after a short flash-off time is cured in a forced-air drying oven at 160° C. for 15 minutes.

After cooling, the drawdowns, still lying on the glass plate, are subjected to colorimetry on the side facing away from the glass, using the multiflash spectrophotometer (from Optronic), and the color strength and CIELab color values L* (lightness), C* (chroma, i.e., cleanness of color) and HGD (hue) are calculated using the BCSWIN program (BASF Color System). Evaluation takes place on the data obtained at a measurement angle of 45°.

Comparative Example 1

Preparation of the Pigment $(TiO_2)_{1.6}(ZnO)_1(SnO)_1$ 23.88 g of $TiO_2$, 25.44 g of $SnO_1$ and 15.2 g of ZnO are weighed out into a 250 ml plastic bottle containing 250 g of steatite beads (diameter: 8 mm) and are mixed dry in an intensive mixer (from Skandex) for 30 minutes. The crude mixture is transferred to the quartz flask and then heated to 900° C. under nitrogen (10-15 l/h) within 1 h and calcined at 900° C. for 1 h. The furnace clinker is ground as described above in a porcelain vibratory mill. After drying and deagglomeration, the plastisol pigmentations are prepared and subjected to colorimetry. Coloristic measurement gives the following values:

| Molar ratio | | | White reduction | Mass tone | | |
|---|---|---|---|---|---|---|
| $TiO_2$ | SnO | ZnO | CE | HGD | C* | L* |
| 1.6 | 1 | 1 | 160 | 59.0 | 79.2 | 54.1 |

Comparative Example 2

Preparation of the Pigment $(TiO_2)_{1.6}(ZnO)_1(SnO)_{0.8}$ 23.88 g of $TiO_2$, 20.35 g of SnO and 15.2 g of ZnO are weighed out and processed as in comparative example 1. Coloristic measurement gives the following values:

| Molar ratio | | | White reduction | Mass tone | | |
|---|---|---|---|---|---|---|
| $TiO_2$ | SnO | ZnO | CE | HGD | C* | L* |
| 1.6 | 0.8 | 1 | 184 | 60.2 | 72.6 | 54.5 |

The pigment is noticeably weaker in color, somewhat more yellow, and considerably dirtier than the pigment of comparative example 1.

Comparative Examples 3 to 6

Preparation of Pigments $(TiO_2)_{1.6}(ZnO)_1(SnO)_{1-x}(SnO_2)_x$

In comparative examples 3-6 some of the SnO is replaced by $SnO_2$. Synthesis and evaluation take place as in example 1. The table shows the amounts of the raw materials used and the results of the coloristic tests.

| | Initial mass (g) | | | | Molar ratio | | | | White reduction | Mass tone | | |
|---|---|---|---|---|---|---|---|---|---|---|---|---|
| | $TiO_2$ | SnO | $SnO_2$ | ZnO | $TiO_2$ | SnO | $SnO_2$ | ZnO | CE | HGD | C* | L* |
| Comp. ex. 3 | 23.88 | 24.14 | 1.41 | 15.2 | 1.6 | 0.95 | 0.05 | 1 | 154 | 59.7 | 81.0 | 55.0 |
| Comp. ex. 4 | 23.88 | 22.87 | 2.82 | 15.2 | 1.6 | 0.9 | 0.1 | 1 | 154 | 61.3 | 76.5 | 55.2 |
| Comp. ex. 5 | 23.88 | 21.6 | 4.22 | 15.2 | 1.6 | 0.85 | 0.15 | 1 | 162 | 61.1 | 80.7 | 57.5 |
| Comp. ex. 6 | 23.88 | 20.33 | 5.63 | 15.2 | 1.6 | 0.8 | 0.2 | 1 | 169 | 62.7 | 79.0 | 59.9 |

The partial replacement of SnO by $SnO_2$ makes the pigments somewhat yellower in tone and somewhat lighter. The color strength at 5 and 10 mol % $SnO_2$ is somewhat higher than without $SnO_2$ substitution, and drops off at a higher $SnO_2$ fraction.

Inventive Examples 1 to 7

Preparation of Pigments $(TiO_2)_a(ZnO)_b(SnO)_c(La_2O_3)_e$

In examples 1-7, as compared with comparative example 1, some of the SnO is replaced by $La_2O_3$. Synthesis and evaluation take place as described in example 1. The table shows the amounts of the raw materials employed and the results of the coloristic tests.

|  | Initial mass (g) | | | | Molar ratio | | | | White reduction | Mass tone | | |
|---|---|---|---|---|---|---|---|---|---|---|---|---|
|  | $TiO_2$ | SnO | $La_2O_3$ | ZnO | $TiO_2$ | SnO | $La_2O_3$ | ZnO | CE | HGD | C* | L* |
| Example 1 | 23.88 | 24.81 | 0.76 | 15.2 | 1.6 | 0.975 | 0.0125 | 1 | 132 | 61.6 | 79.5 | 56.2 |
| Example 2 | 23.88 | 24.17 | 1.52 | 15.2 | 1.6 | 0.95 | 0.025 | 1 | 108 | 64.1 | 81.5 | 58.1 |
| Example 3 | 23.88 | 23.54 | 2.28 | 15.2 | 1.6 | 0.925 | 0.0375 | 1 | 100 | 64.1 | 83.4 | 58.6 |
| Example 4 | 23.88 | 22.9 | 3.04 | 15.2 | 1.6 | 0.9 | 0.05 | 1 | 109 | 64.7 | 84.6 | 63.5 |
| Example 5 | 23.88 | 21.62 | 4.56 | 15.2 | 1.6 | 0.85 | 0.075 | 1 | 103 | 64.2 | 85.9 | 63.1 |
| Example 6 | 23.88 | 20.99 | 5.33 | 15.2 | 1.6 | 0.825 | 0.0875 | 1 | 119 | 63.5 | 83.5 | 60.5 |
| Example 7 | 23.88 | 20.35 | 6.09 | 15.2 | 1.6 | 0.8 | 0.1 | 1 | 124 | 66.6 | 77.7 | 60.6 |

Increasing substitution of $La_2O_3$ for SnO makes the pigments yellower in tone. Up to a fraction of 0.075 mol $La_2O_3$ to 1.6 mol $TiO_2$, there are very considerable increases in the color strength, the cleanness of color, and, in particular the lightness of the pigments, while with an even higher $La_2O_3$ fraction the pigments exhibit a loss again of color strength, cleanness of color, and lightness.

The X-ray powder diffractogram of the composition of example 7 shows the position of the five main reflections virtually unchanged as compared with the comparison pigment comprising no $La_2O_3$.

Examples 8-11

Preparation of Pigments $(TiO_2)_a(ZnO)_b(SnO)_c(CeO_2)_e$

In examples 8-11, as compared with comparative example 1, some of the SnO is replaced by $CeO_2$. Synthesis and evaluation take place as in example 1. The table shows the amounts of the raw materials used and the results of the coloristic tests.

The partial replacement of SnO by $CeO_2$ makes the pigments yellower in tone, considerably cleaner, lighter, and considerably stronger in color than the pigment of comparative example 1. This effect occurs to approximately the same extent for all $CeO_2$ fractions.

Example 12

Preparation of a Pigment $(TiO_2)_a(ZnO)_b(SnO)_c(La_2O_3)_e(CeO_2)_e$

|  | Initial mass (g) | | | | Molar ratio | | | | White reduction | Mass tone | | |
|---|---|---|---|---|---|---|---|---|---|---|---|---|
|  | $TiO_2$ | SnO | $CeO_2$ | ZnO | $TiO_2$ | SnO | $CeO_2$ | ZnO | CE | HGD | C* | L* |
| Example 8 | 23.88 | 24.79 | 0.8 | 15.2 | 1.6 | 0.975 | 0.025 | 1 | 93 | 64.0 | 85.8 | 57.9 |
| Example 9 | 23.88 | 24.16 | 1.61 | 15.2 | 1.6 | 0.95 | 0.05 | 1 | 93 | 64.7 | 85.0 | 59.3 |
| Example 10 | 23.88 | 23.53 | 2.41 | 15.2 | 1.6 | 0.925 | 0.075 | 1 | 95 | 64.7 | 84.5 | 59.7 |
| Example 11 | 23.88 | 22.9 | 3.22 | 15.2 | 1.6 | 0.9 | 0.1 | 1 | 95 | 65.1 | 83.0 | 59.3 |

In example 12, some of the SnO is replaced by a combination of $La_2O_3$ and $CeO_2$. Synthesis and evaluation take place as in example 1. The table shows the amounts of raw materials used and the results of the coloristic tests.

|  | Initial mass (g) | | | | |
|---|---|---|---|---|---|
|  | $TiO_2$ | SnO | $La_2O_3$ | $CeO_2$ | ZnO |
| Example 12 | 23.88 | 21.62 | 3.04 | 1.61 | 15.2 |

|  | Molar ratio | | | | | White reduction | Mass tone | | |
|---|---|---|---|---|---|---|---|---|---|
|  | $TiO_2$ | SnO | $La_2O_3$ | $CeO_2$ | ZnO | CE | HGD | C* | L* |
| Example 12 | 1.6 | 0.85 | 0.05 | 0.05 | 1 | 104 | 65.1 | 83.7 | 61.3 |

The partial replacement of SnO by $La_2O_3$ and $CeO_2$ makes the pigment yellower in tone, considerably cleaner, much lighter, and considerably stronger in color than the pigment of comparative example 1.

Example 13

Preparation of a Pigment $(TiO_2)_a(ZnO)_b(SnO)_c(Y_2O_3)_e$

In example 13, some of the SnO is replaced by $Y_2O_3$. Synthesis and evaluation take place as in example 1. The table shows the amounts of raw materials used and the results of the coloristic tests.

|  | Initial mass (g) | | | | Molar ratio | | | | White reduction | Mass tone | | |
|---|---|---|---|---|---|---|---|---|---|---|---|---|
|  | $TiO_2$ | SnO | $Y_2O_3$ | ZnO | $TiO_2$ | SnO | $Y_2O_3$ | ZnO | CE | HGD | C* | L* |
| Example 13 | 23.88 | 24.17 | 1.06 | 15.2 | 1.6 | 0.95 | 0.025 | 1 | 97 | 63.4 | 83.4 | 56.7 |

The partial replacement of SnO by $Y_2O_3$ makes the pigment yellower in tone, much cleaner, somewhat lighter, and considerably stronger in color than the pigment of comparative example 1.

Example 14

Preparation of a Pigment $(TiO_2)_a(ZnO)_b(SnO)_c(SnO_2)_d(La_2O_3)_e$

In example 14, some of the SnO is replaced by a combination of $La_2O_3$ and $SnO_2$. Synthesis and evaluation take place as in example 1. The table shows the amounts of raw materials used and the results of the coloristic tests.

|  | Initial mass (g) | | | | |
|---|---|---|---|---|---|
|  | $TiO_2$ | SnO | $SnO_2$ | $La_2O_3$ | ZnO |
| Example 14 | 23.88 | 17.75 | 5.63 | 3.04 | 15.2 |

|  | Molar ratio | | | | | White reduction | Mass tone | | |
|---|---|---|---|---|---|---|---|---|---|
|  | $TiO_2$ | SnO | $SnO_2$ | $La_2O_3$ | ZnO | CE | HGD | C* | L* |
| Example 14 | 1.6 | 0.7 | 0.2 | 0.05 | 1 | 127 | 64.9 | 82.4 | 64.3 |

The partial replacement of SnO by $SnO_2$ and $La_2O_3$ makes the pigment yellower in tone, noticeably cleaner, considerably lighter, and noticeably stronger in color than the pigments of comparative example 2.

Example 15

Preparation of a Pigment $(TiO_2)_a(ZnO)_b(SnO)_c(La_2O_3)_e$

In example 15, as compared with comparative example 1, $La_2O_3$ is added additionally. Synthesis and evaluation take place as in example 1. The table shows the amounts of the raw materials used and the results of the coloristic tests.

|  | Initial mass (g) | | | | Molar ratio | | | | White reduction | Mass tone | | |
|---|---|---|---|---|---|---|---|---|---|---|---|---|
|  | TiO$_2$ | SnO | La$_2$O$_3$ | ZnO | TiO$_2$ | SnO | La$_2$O$_3$ | ZnO | CE | HGD | C* | L* |
| Example 15 | 23.88 | 25.44 | 4.56 | 15.2 | 1.6 | 1 | 0.075 | 1 | 89 | 65.1 | 82.4 | 57.4 |

The addition of La$_2$O$_3$ to the base formula of comparative example 1 makes the pigment yellower in tone, much cleaner, somewhat lighter, and considerably stronger in color than the pigment of comparative example 1.

Examples 16 and 17

Preparation of Pigments (TiO$_2$)$_{1.6}$(ZnO)$_1$(SnO)$_{1-x}$(Pr$_6$O$_{11}$)$_y$ In examples 16 and 17, some of the SnO is replaced by Pr$_6$O$_{11}$. Synthesis and evaluation take place as described in example 1. The table shows the amounts of the raw materials used and the results of the coloristic tests.

|  | Initial mass (g) | | | | Molar ratio | | | | White reduction | Mass tone | | |
|---|---|---|---|---|---|---|---|---|---|---|---|---|
|  | TiO$_2$ | SnO | Pr$_6$O$_{11}$ | ZnO | TiO$_2$ | SnO | Pr$_6$O$_{11}$ | ZnO | CE | HGD | C* | L* |
| Example 16 | 23.88 | 24.16 | 1.592 | 15.2 | 1.6 | 0.95 | 0.008 | 1 | 94 | 65.6 | 79.8 | 46.5 |
| Example 17 | 23.88 | 21.62 | 4.78 | 15.2 | 1.6 | 0.85 | 0.025 | 1 | 103 | 63.6 | 85.2 | 60.3 |

The partial replacement of SnO by Pr$_6$O$_{11}$ makes the pigments yellower in tone and considerably stronger in color than the pigment of comparative example 1. The pigment in example 16 is noticeably darker than comparative example 1, while the pigment in example 17 is much lighter and cleaner than comparative example 1.

Examples 18 to 21

Preparation of Pigments (TiO$_2$)$_{1.6}$(ZnO)$_1$(SnO)$_{0.9}$(AEO)$_{0.1}$

In examples 18 to 21, some of the SnO is replaced by alkaline earth metal compounds which on calcination are converted into the corresponding alkaline earth metal oxides (MeO). Synthesis and evaluation take place as described in example 1. The table shows the amounts of the raw materials used and the results of the coloristic tests.

Coloristic evaluation of the pigments prepared shows a distinct difference between magnesium on the one hand and its higher homologues on the other. While magnesium makes the pigment much dirtier than comparative example 1, calcium, strontium, and barium produce a considerable alteration as compared with comparative example 1, toward yellower, cleaner, lighter and more strongly colored pigments.

Examples 22 and 23

Preparation of Pigments (TiO$_2$)$_{1.6}$(ZnO)$_1$(SnO)$_1$(AEO)$_{0.1}$

In examples 22 and 23, as compared with the stoichiometry of comparative example 1, fractions of alkaline earth metal compounds which on calcination are converted into the corresponding alkaline earth metal oxides (AEO) are added additionally. Synthesis and evaluation take place as in example 1. The table shows the amounts of the raw materials used and the results of the coloristic tests.

|  | AEX= | Initial mass (g) | | | | Molar ratio | | | | White reduction | Mass tone | | |
|---|---|---|---|---|---|---|---|---|---|---|---|---|---|
|  |  | TiO$_2$ | SnO | AEX | ZnO | TiO$_2$ | SnO | AEO | ZnO | CE | HGD | C* | L* |
| Example 18 | MgCO$_3$ | 23.88 | 22.9 | 1.75 | 15.2 | 1.6 | 0.9 | 0.1 | 1 | 144 | 63.0 | 72.8 | 54.1 |
| Example 19 | Ca(OH)$_2$ | 23.88 | 22.9 | 1.44 | 15.2 | 1.6 | 0.9 | 0.1 | 1 | 75 | 66.8 | 83.1 | 58.8 |
| Example 20 | Sr(OH)$_2$ × 8H$_2$O | 23.88 | 22.9 | 4.97 | 15.2 | 1.6 | 0.9 | 0.1 | 1 | 84 | 68.6 | 86.6 | 64.2 |
| Example 21 | Ba(OH)$_2$ × 8H$_2$O | 23.88 | 22.9 | 5.9 | 15.2 | 1.6 | 0.9 | 0.1 | 1 | 104 | 65.8 | 85.3 | 62.6 |

| | AEX= | Initial mass (g) | | | | Molar ratio | | | | White reduction | Mass tone | | |
|---|---|---|---|---|---|---|---|---|---|---|---|---|---|
| | | $TiO_2$ | SnO | AEX | ZnO | $TiO_2$ | SnO | AEO | ZnO | CE | HGD | C* | L* |
| Example 22 | $MgCO_3$ | 23.88 | 25.44 | 1.75 | 15.2 | 1.6 | 1 | 0.1 | 1 | 128 | 63.8 | 78.2 | 55.8 |
| Example 23 | $Ca(OH)_2$ | 23.88 | 25.44 | 1.44 | 15.2 | 1.6 | 1 | 0.1 | 1 | 74 | 66.6 | 83.7 | 57.5 |

As in example 18, a fraction of magnesium in the formula produces a deterioration in the cleanness of color (C*) as compared with comparative example 1, whereas the presence of calcium leads to a marked increase in cleanness of color, lightness, and the color strength.

Example 24

Preparation of a Pigment $(TiO_2)_{1.6}(ZnO)_1(SnO)_{0.9}(La_2O_3)_{0.05}(CaO)_{0.1}$ In example 24, some of the SnO is replaced by $La_2O_3$ and additionally a fraction of CaO is added. Synthesis and evaluation take place in the same way as described in example 1. The table shows the amounts of the raw materials used and the results of the coloristic tests.

For all of the titanium dioxide fractions employed, coloristic evaluation of the pigments prepared shows a distinct difference between $La_2O_3$-free and $La_2O_3$-containing products. In general, the addition of the $La_2O_3$ makes the pigments yellower in tone, cleaner, lighter and more strongly colored. Examples 25 and 26 show that for a titanium dioxide fraction of 1.2 or less, the addition of $La_2O_3$ improves lightness and color strength, whereas the chroma suffers a slight reduction.

| | Initial mass (g) | | | | | Molar ratio | | | | | White reduction | Mass tone | | |
|---|---|---|---|---|---|---|---|---|---|---|---|---|---|---|
| | $TiO_2$ | SnO | $La_2O_3$ | $Ca(OH)_2 \times 8H_2O$ | ZnO | $TiO_2$ | SnO | $La_2O_3$ | CaO | ZnO | CE | HGD | C* | L* |
| Example 24 | 23.88 | 22.9 | 3.04 | 1.44 | 15.2 | 1.6 | 0.9 | 0.05 | 0.1 | 1 | 84 | 65.7 | 86.7 | 61.6 |

The addition of $La_2O_3$ and CaO leads to considerably higher color strength, considerably higher cleanness, and considerably higher lightness as compared with comparative example 1.

Examples 25 to 28 and Comparative Examples 3 to 6

Preparation of Pigments $(TiO_2)_x(ZnO)_1(SnO)_{0.85}(La_2O_3)_{0.075}$ and $(TiO_2)_x(ZnO)_1(SnO)_1(La_2O_3)_{0.075}$ In examples 25 to 28 and comparative examples 3 to 6 a different fraction of titanium dioxide is used, in each case with and without addition of $La_2O_3$. Synthesis and evaluation take place in the same way as in example 1. The table shows the amounts of the raw materials used and the results of the coloristic tests.

Examples 29 to 31 and Comparative Examples 7 to 9

Preparation of Pigments $(TiO_2)_{1.6}(ZnO)_1(SnO)_z(La_2O_3)_{0.075}$

In examples 29 to 31 and comparative examples 7 to 9 a different fraction of tin oxide is used, in each case with and without addition of $La_2O_3$. Synthesis and evaluation take place in the same way as in example 1. The table shows the amounts of the raw materials used and the results of coloristic tests.

| | Initial mass (g) | | | | Molar ratio | | | | White reduction | Mass tone | | |
|---|---|---|---|---|---|---|---|---|---|---|---|---|
| | $TiO_2$ | SnO | $La_2O_3$ | ZnO | $TiO_2$ | SnO | $La_2O_3$ | ZnO | CE | HGD | C* | L* |
| Comp. ex. 3 | 14.93 | 25.44 | 4.56 | 15.2 | 1 | 1 | 0.075 | 1 | 156 | 68.0 | 63.4 | 51.9 |
| Example 25 | 14.93 | 25.44 | | 15.2 | 1 | 1 | | 1 | 130 | 76.0 | 61.8 | 55.0 |
| Comp. ex. 4 | 17.91 | 25.44 | 4.56 | 15.2 | 1.2 | 1 | 0.075 | 1 | 143 | 65.2 | 68.7 | 51.6 |
| Example 26 | 17.91 | 21.62 | | 15.2 | 1.2 | 0.85 | | 1 | 119 | 70.5 | 67.5 | 55.4 |
| Comp. ex. 5 | 20.88 | 25.44 | 4.56 | 15.2 | 1.4 | 1 | 0.075 | 1 | 160 | 60.0 | 77.3 | 53.3 |
| Example 27 | 20.88 | 21.62 | | 15.2 | 1.4 | 0.85 | | 1 | 105 | 65.9 | 82.6 | 60.0 |
| Comp. ex. 6 | 37.31 | 25.44 | 4.56 | 15.2 | 2.5 | 1 | 0.075 | 1 | 185 | 60.3 | 72.1 | 54.8 |
| Example 28 | 37.31 | 25.44 | | 15.2 | 2.5 | 1 | | 1 | 115 | 65.0 | 74.7 | 59.0 |

|  | Initial mass (g) | | | | Molar ratio | | | | White reduction | Mass tone | | |
| --- | --- | --- | --- | --- | --- | --- | --- | --- | --- | --- | --- | --- |
|  | TiO$_2$ | SnO | La$_2$O$_3$ | ZnO | TiO$_2$ | SnO | La$_2$O$_3$ | ZnO | CE | HGD | C* | L* |
| Comp. ex. 7 | 23.88 | 16.53 | 4.56 | 15.2 | 1.6 | 0.65 | 0.075 | 1 | 184 | 61.6 | 71.2 | 58.1 |
| Example 29 | 23.88 | 16.53 |  | 15.2 | 1.6 | 0.65 |  | 1 | 138 | 65.0 | 73.4 | 59.5 |
| Comp. ex. 8 | 23.88 | 20.35 | 4.56 | 15.2 | 1.6 | 0.8 | 0.075 | 1 | 184 | 60.2 | 72.6 | 54.5 |
| Example 30 | 23.88 | 20.35 |  | 15.2 | 1.6 | 0.8 |  | 1 | 103 | 65.6 | 78.3 | 59.0 |
| Comp. ex. 9 | 23.88 | 30.53 | 4.56 | 15.2 | 1.6 | 1.2 | 0.075 | 1 | 151 | 60.7 | 77.6 | 50.1 |
| Example 31 | 23.88 | 30.53 |  | 15.2 | 1.6 | 1.2 |  | 1 | 80 | 68.0 | 79.7 | 56.7 |

For all of the tin oxide fractions employed, coloristic evaluation of the pigments prepared shows a distinct difference between La$_2$O$_3$-free and La$_2$O$_3$-containing products. The addition of La$_2$O$_3$ makes the pigments yellower in tone, cleaner, lighter and more strongly colored.

Examples 32 and 33 and Comparative Examples 10 and 11

Preparation of Pigments (TiO$_2$)$_{1.6}$(ZnO)$_y$(SnO)$_1$(La$_2$O$_3$)$_{0.075}$ In examples 32 and 33 and comparative examples 10 and 11, a different fraction of zinc oxide is used, in each case with and without addition of La$_2$O$_3$. Synthesis and evaluation take place in the same way as described in example 1. The table shows the amounts of the raw materials used and the results of the coloristic tests.

|  | Initial mass (g) | | | | Molar ratio | | | | White reduction | Mass tone | | |
| --- | --- | --- | --- | --- | --- | --- | --- | --- | --- | --- | --- | --- |
|  | TiO$_2$ | SnO | La$_2$O$_3$ | ZnO | TiO$_2$ | SnO | La$_2$O$_3$ | ZnO | CE | HGD | C* | L* |
| Comp. ex. 10 | 23.88 | 25.44 | 4.56 | 12.92 | 1.6 | 1 | 0.075 | 0.85 | 160 | 63.1 | 69.1 | 51.5 |
| Example 32 | 23.88 | 25.44 |  | 12.92 | 1.6 | 1 |  | 0.85 | 95 | 64.5 | 84.3 | 58.3 |
| Comp. ex. 11 | 23.88 | 25.44 | 4.56 | 18.24 | 1.6 | 1 | 0.075 | 1.2 | 122 | 60.4 | 75.0 | 51.9 |
| Example 33 | 23.88 | 25.44 |  | 18.24 | 1.6 | 1 |  | 1.2 | 89 | 67.5 | 77.2 | 57.8 |

The addition of La$_2$O$_3$ leads to considerably higher color strength, considerably higher cleanness, and considerably higher lightness as compared with the pigments without a lanthanum addition.

The invention claimed is:
1. A pigment of empirical composition

(TiO$_2$)$_a$(ZnO)$_b$(SnO)$_c$(SnO$_2$)$_d$(REO$_y$)$_e$(AEO)$_f$(MO)$_g$ wherein
REO$_y$ is an oxide in which RE is a transition group 3 metal or a rare earth metal and y varies from 1 to 2,
AEO is an oxide in which AE is an alkaline earth metal, and MO is an oxide of a metal M which is any other metal,
where
0.8≦a≦3;
0.5≦b≦1.3;
0.5≦c≦1.3;
0≦d0.5;
0≦e0.3;
0≦f≦0.3; and
0≦g≦0.1,
and e+f≧0.01.

2. The pigment according to claim 1, wherein RE is selected from the group consisting of yttrium, lanthanum, cerium and praseodymium and mixtures thereof.

3. The pigment according to claim 1, wherein AE is selected from the group consisting of calcium, strontium and barium and mixtures thereof.

4. The pigment according to claim 1, wherein
1.0≦a≦3,
0.7≦b≦1.3, and
0.7≦c≦1.3.

5. The pigment according to claim 1, wherein f=0.

6. The pigment according to claim 1, wherein 0.01≦e≦0.3 and 0.01≦f≦0.3.

7. The pigment according to claim 1, wherein e=0.

8. The pigment according to claim 1, wherein M is Zr, Al, Si, V, Nb, Mo, W, Sb, Bi or Pb.

9. The pigment according to claim 1, wherein MO is selected from the group consisting of ZrO$_2$, Al$_2$O$_3$, and SiO$_2$.

10. The pigment according to claim 1, wherein M is selected from the group consisting of Zr, Al and Si.

11. The pigment according to claim 6, wherein AE is selected from the group consisting of Ca, Sr and Ba.

12. The pigment according to claim 1, wherein 0.01≦e≦0.3 and f=0.

13. The pigment according to claim 1, wherein e=0 and 0.01≦f≦0.3.

14. The pigment according to claim 1, wherein REO$_y$ is an oxide represented by REO, RE$_2$O$_3$, REO$_2$, a combination of REO and RE$_2$O$_3$, or a combination of RE$_2$O$_3$ and REO$_2$.

15. A method of producing a pigment according to claim 1, comprising
mixing TiO$_2$, ZnO, SnO, optionally at least one of SnO$_2$, RE$_x$O$_y$, AEO and M$_u$O$_v$, or a precursor compound thereof as a dry powder to form a powder mixture,
calcining the powder mixture at temperatures between 800 and 1100° C. under an inert gas atmosphere to form a furnace clinker, and
grinding the resulting furnace clinker.

16. The method according to claim 15, wherein REO is selected from the group consisting of $Y_2O_3$, $La_2O_3$, $CeO_2$ and $Pr_6O_{11}$.

17. A pigment mixture comprising
 a) 1% to 90% by weight of a pigment according to claim 1 and
 b) 10% to 99% by weight of at least one of an organic or inorganic pigment and a platelet-shaped metallic or oxidic effect pigment.

* * * * *